United States Patent [19]
Kates

[15] 3,663,071
[45] May 16, 1972

[54] PRESSURE-BALANCED PISTON AND THE LIKE

[72] Inventor: Willard A. Kates, Deerfield, Ill.
[73] Assignee: The W. A. Kates Company
[22] Filed: Apr. 23, 1971
[21] Appl. No.: 137,010

Related U.S. Application Data

[63] Continuation of Ser. No. 771,551, Oct. 29, 1968, abandoned.

[52] U.S. Cl. .................................... 308/5, 184/5
[51] Int. Cl. .................................... F16c 1/24, F16c 33/10
[58] Field of Search .................... 308/5; 184/5, 24, 100

[56] References Cited

UNITED STATES PATENTS

| | | | |
|---|---|---|---|
| 2,689,626 | 9/1954 | Peters | 308/5 X |
| 3,001,609 | 9/1961 | Macks | 308/5 X |
| 3,127,955 | 4/1964 | Macks | 308/5 X |
| 2,523,358 | 9/1950 | Conner | 184/5 |
| 3,479,097 | 11/1969 | McLauchlan et al. | 308/5 |

FOREIGN PATENTS OR APPLICATIONS

| | | | |
|---|---|---|---|
| 781,459 | 2/1935 | France | 308/5 V |
| 279,547 | 9/1927 | Canada | 308/5 V |
| 754,039 | 3/1967 | Canada | 308/5 V |
| 738,163 | 10/1955 | Great Britain | 308/5 V |
| 947,060 | 1/1964 | Great Britain | 308/5 V |
| 992,230 | 5/1965 | Great Britain | 308/5 V |

*Primary Examiner*—Manuel A. Antonakas
*Attorney*—Hofgren, Wegner, Allen, Stellman & McCord

[57] ABSTRACT

A pressure-balanced system wherein a cylindrical member such as a piston, a shaft, or the like, is movably received in a cylinder bore. Means are provided for balancing the cylindrical member so as to reduce friction between the cylindrical member and the wall of the cylinder bore as may result from a flow of fluid under pressure from an adjacent high-pressure space to an adjacent low-pressure space through the cylinder bore. The balancing means illustratively comprises an annular groove opening to the clearance space between the cylindrical member and the wall of the cylinder bore. In one form, the annular groove is disposed in the cylinder. In another form, the annular groove is disposed in the wall of the cylinder bore. The balancing means may be provided at the end of the clearance space adjacent the high-pressure space, the low-pressure space, or both as desired. Means are provided for causing direct communication between the annular groove and the adjacent pressure space. The communication means illustratively comprises passages in the member in which the annular groove is provided. The illustrated passages comprise bores or laterally opening grooves.

13 Claims, 7 Drawing Figures

PATENTED MAY 16 1972

3,663,071

Inventor:—
Willard A. Kates,
By Hofgren, Wegner, Allen,
Stellman & McCord Attys.

PRESSURE-BALANCED PISTON AND THE LIKE

This is a continuation of application, Ser. No. 771,551, filed Oct. 29, 1968 and now abandoned.

BACKGROUND OF THE INVENTION

1. Field of the Invention

This invention relates to pressure-balanced systems wherein cylindrical members such as pistons, shafts, etc., are movably disposed in a bore an outer member. More specifically, the invention relates to means for reducing friction in such systems.

2. Description of the Prior Art

In apparatuses having a cylindrical member movably received in a bore of an outer member, such as piston-cylinder devices, shaft-journal devices, etc., a problem arises in the sticking, or frictional opposition to free movement, of the cylindrical member relative to the wall of the outer member. In such apparatuses, resort has been had to fine finishing of the confronting surfaces so as to minimize such sticking under friction. Such attempted solution to this vexatious problem has not proven completely satisfactory, however, as in some such high finished devices sticking and high friction may still be encountered.

One improved form of apparatus for minimizing such sticking and frictional forces is shown in my U.S. Pat. No. 3,223,115 for a flow regulating apparatus. As shown therein, the piston may be tapered at its end to provide a circumferential angular surface thereat sufficient to draw fluid flowing through the device between the reciprocally sliding surfaces to effectively minimize friction and prevent sticking of the piston in the cylinder. Further, the piston is provided with annular grooves causing a pressure gradient in an approximately straight line between the two ends of the piston tending to center the piston in the cylinder.

SUMMARY OF THE INVENTION

The present invention comprehends a further improved means for balancing the fluid pressure about such a cylindrical member for effectively minimizing friction and sticking in such devices. More specifically, the invention comprehends the provision of improved means for controlling the pressure drop in an entrance to the clearance space between the cylindrical member and the circumjacent outer member wall to make this pressure drop relatively small and thereby minimize lateral thrust tending to cock the cylindrical member and increase friction and sticking thereof relative to the surrounding outer member wall. In the illustrated embodiment, the cylindrical member may comprise a piston or a through shaft.

The friction-reducing means hereof comprises an annular groove in one of the confronting members opening toward the clearance space therebetween and means for placing the groove in communication with the adjacent pressure space to cause the pressure drop at the entrance to the clearance space to have a preselected low value. The annular groove may be adjacent the entrance to the clearance space at the high-pressure end thereof, the low-pressure end thereof, or at both ends as desired. The annular groove may be provided in the cylindrical member or in the wall of the surrounding outer member. The communication means may comprise passages through either of the members and in the illustrative embodiment the passages are shown in the member in which the groove is provided. Alternatively, the communication means may comprise grooves opening laterally to the clearance space and longitudinally to the annular groove and adjacent pressure space.

More specifically, the invention comprehends the provision of structure for effectively minimizing friction of a cylindrical member against an outer member wall as a result of fluid flow through a clearance space from an adjacent low-pressure space, the structure including means on at least one of the members defining an annular recess in one of the members opening to the clearance space at a portion of the cylindrical member spaced adjacent a portion of the cylindrical member closest to one of the pressure spaces, and means providing communication between the recess and the high-pressure space preselected to make the pressure drop through said clearance space between said portions of the cylindrical member a preselected low value.

BRIEF DESCRIPTION OF THE DRAWING

Other features and advantages of the invention will be apparent from the following description taken in connection with the accompanying drawing wherein.

DESCRIPTION OF THE PREFERRED EMBODIMENTS

Figure 1:
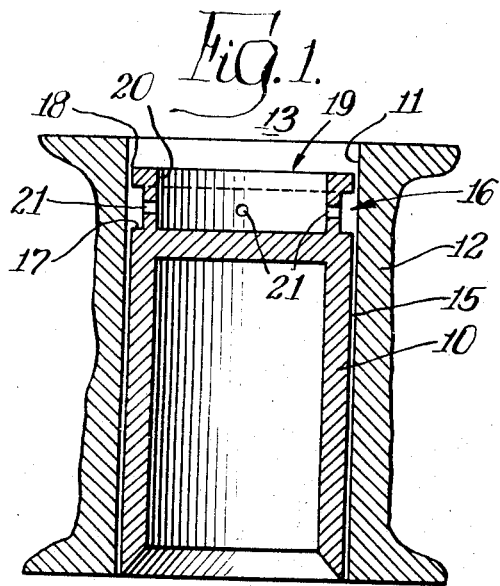
FIG. 1 is a fragmentary diametric section of an apparatus embodying the invention.

In the exemplary embodiment of the invention as disclosed in the drawing, improved means are provided for minimizing friction and sticking between relatively movable members. In illustrating the invention, the relatively movable members are shown as piston-cylinder and shaft-journal devices, it being understood that the invention may be used with other similar relatively movable members.

Figure 2:
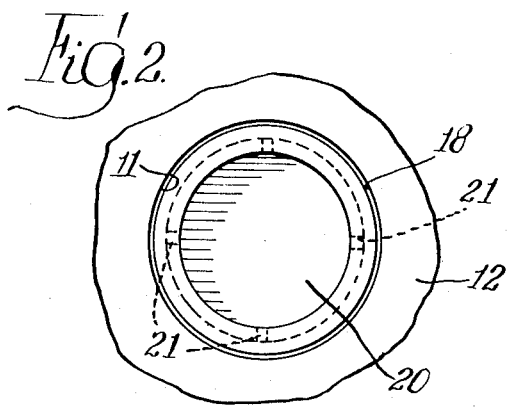
FIG. 2 is a fragmentary top plan view thereof.

Referring to FIGS. 1 and 2, a cylindrical member 10 comprising a control piston is coaxially movably disposed in the bore 11 of an outer cylinder member 12. Bore 11 opens at one end to a high-pressure space 13 and at its opposite end to a low-pressure space 14. Piston 10 is transversely slightly smaller than bore 11 and, thus, fluid may flow under pressure from high-pressure space 13 through an annular clearance space 15 between the piston 10 and cylinder member 12 to the low-pressure space 14. In conventional piston-cylinder devices, such fluid flow tends to cock the piston, which cocking tends to increase friction between the piston and cylinder causing the movement of the piston to be impeded, or sluggish, and thereby reducing the accuracy of control effected by the piston.

The present invention comprehends an improved friction-minimizing means generally designated 16 comprising an annular groove 17 in the end of the piston 10 spaced slightly from the entrance 18 to the clearance space 15 from the high-pressure space 13. As shown in FIG. 1, the annular groove 17 opens radially outwardly to the clearance space 15.

Means generally designated 19 provide communication between the high-pressure space 13 and the annular groove 17. In the illustrated form of FIG. 1, the communication means 19 comprise a first passage means defined by an axial recess 20 and a second passage means defined by a plurality of radial ports 21 providing a through-flow passage between the high-pressure space 13 and groove 17. The ports 21 are preselected to restrict flow of the pressure fluid from space 13 to provide a preselected flow in parallel with the fluid flow through the entrance 18 to the clearance space 15.

Thus, fluid flowing through the clearance space 15 is divided into two parallel paths adjacent the entrance 18, one path being directly through the entrance 18 from high-pressure space 13 and the other path being through the recess 20, the ports 21, and the annular groove 17. Therefore, the pressure drop at entrance 18 may be controlled, as by control of the pressure drop through the ports 21, to be independent of the parameters of the piston and cylinder bore dimensions. The resultant control of the lateral thrust on the piston thusly effectively minimizes friction of the piston 10 against the cylinder wall 12 thereby effectively substantially increasing the accuracy and speed of movement of piston 10 relative to the cylinder wall 12.

Figure 3:
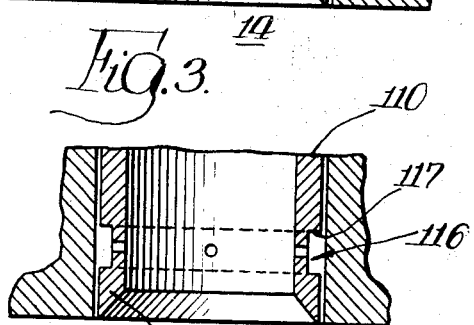
FIG. 3 is a fragmentary diametric section illustrating a modified form of apparatus embodying the invention.

The friction-minimizing means may be employed not only at the high-pressure end of the devices, but may alternatively, or additionally, be provided at the low-pressure end. Thus, as shown in FIG. 3, the annular groove 117 may be provided in the lower end 122 of the piston 110 to define a friction-reducing means 116 generally similar to means 16 of FIG. 1.

Figure 5:
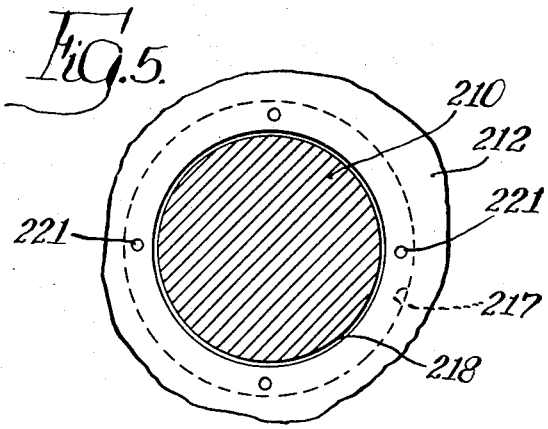
FIG. 5 is a fragmentary top plan view of the apparatus of FIG. 4.
Figure 4:
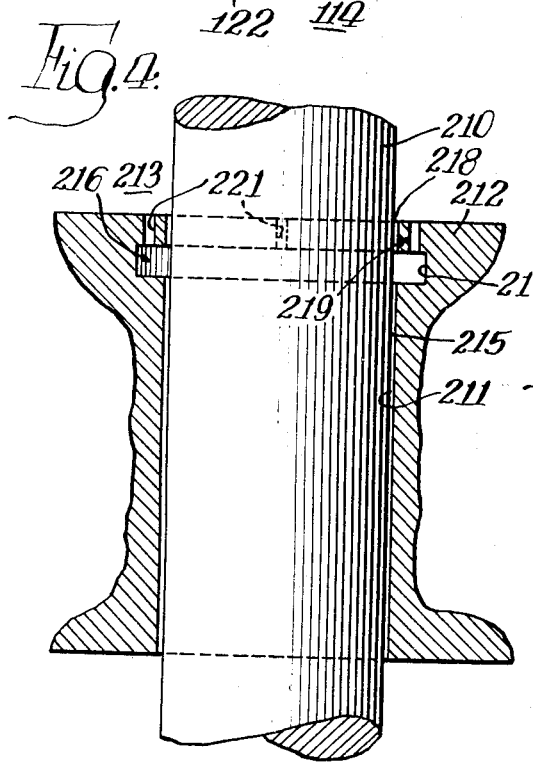
FIG. 4 is a fragmentary diametric section illustrating another modified form of apparatus embodying the invention.

As indicated briefly above, the cylindrical member may comprise forms other than the piston member 10 of FIG. 1. One such additional form is shown in FIG. 4 wherein the cylindrical member comprises a shaft 210 extending through the bore 211 of the outer member 212. Illustratively, the shaft may be journalled in member 212. Further, illustratively, the friction-minimizing means 216 illustrated in FIGS. 4 and 5 may comprise an annular groove 217 provided in the outer member 212 and opening radially inwardly to clearance space 215. As shown, the groove 217 is spaced closely to the portion of shaft 210 at the entrance 218 to the clearance space 215 from high-pressure space 213. The communication means 219 illustratively comprises a plurality of ports 221 extending parallel to the axis of bore 211 and shaft 210. The friction-minimizing means 216, thus, functions similarly to friction-minimizing means 16 in providing a controlled low-pressure drop at the entrance 218 to the clearance space 215 tending to minimize lateral translation forces acting on the shaft 210 as a result of pressure fluid flow through the bore 211.

Figure 6:
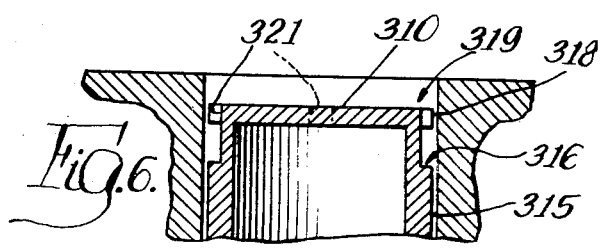
FIG. 6 is a fragmentary diametric section illustrating a further modified form of apparatus embodying the invention.
Figure 7:
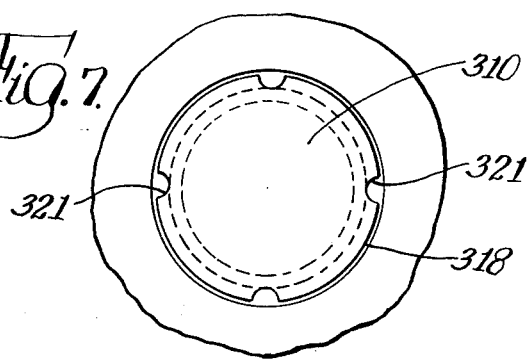
FIG. 7 is a fragmentary top plan view of the apparatus of FIG. 6.

Referring now to FIGS. 6 and 7, a further modified form of apparatus embodying the invention is shown to comprise a piston 310 provided with a friction control means 316 similar to friction control means 16 but wherein the communication means generally designated 319 comprises a plurality of grooves 321 opening laterally outwardly to the clearance space 315 at entrance 318.

Each of the modifications of FIGS. 3–7 is similar to the structure of the embodiment of FIGS. 1 and 2, except as otherwise noted. Similar elements of the different modifications are similarly identified except by reference numerals 100 different in the respective modifications.

In presenting the several modifications discussed above, only one form of each has been shown. As will be obvious to those skilled in the art, the invention comprehends different combinations and alternate dispositions of the disclosed structures. Thus, for example, the use of the longitudinal grooves 321 may be employed in the form of the invention wherein the annular groove is provided on the outer member and in such arrangement, the grooves would open radially inwardly to the clearance space rather than radially outwardly as in means 319. As indicated briefly above, the different friction control means may be alternately disposed at either the high- or low-pressure end, or both, of the apparatus.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. In an apparatus having a cylindrical member movably received in an outer member bore having a first end opening to a high-pressure space and a second end opening to a low-pressure space, said cylindrical member having a transverse section smaller than that of said outer member bore to define a clearance space between said cylindrical and outer members, structure for effectively minimizing friction of the cylindrical member against the outer member bore wall as a result of fluid flow through said clearance space from said high-pressure space to said low-pressure space, said structure comprising: means on at least one of said members defining an annular recess in one of said members opening to said clearance space at a portion of said cylindrical member spaced adjacent a portion of said cylindrical member close to one of said pressure spaces; and four radial passages spaced apart 90° at said recess and having a preselected small diameter for providing limited communication between said recess and said one pressure space for causing a controlled reduced pressure differential between said one space and the pressure of the fluid in said annular recess for effecting centering of said cylindrical member in said bore to minimize frictional drag on the cylindrical member.

2. The structure of claim 1 wherein said cylindrical member comprises a piston.

3. The structure of claim 1 wherein said cylindrical member comprises a shaft.

4. The structure of claim 1 wherein said annular recess is provided in said cylindrical member.

5. The structure of claim 1 wherein said annular recess is provided in said outer member.

6. The structure of claim 1 wherein said annular recess is provided adjacent the portion of the cylindrical member closest to said high pressure space.

7. The structure of claim 1 wherein said annular recess is provided adjacent the portion of the cylindrical member closest to said high-pressure space and said communication means comprises a first flow passage means opening axially to said high-pressure space, and second flow passage means extending transaxially between said first flow passage means and said annular recess.

8. The structure of claim 1 wherein said communication means comprises flow passage means extending parallel to the axis of said cylindrical member.

9. The structure of claim 1 wherein said communication means comprises grooves in said one of said members opening laterally to said clearance space.

10. The structure of claim 1 wherein said communication means comprises a bore in said one of said members spaced transaxially from said clearance space.

11. In an apparatus having a piston member movably received in a cylinder member having a bore defining a first end opening to a high-pressure space and a second end opening to a low-pressure space, said piston member having a transverse section smaller than that of said cylinder member bore to define a clearance space between said piston and cylinder members, structure for effectively minimizing friction of the piston member against the cylinder member bore wall, said structure comprising: means on at least one of said members defining an annular recess in one of said members opening to said clearance space at a portion of said piston member spaced adjacent a portion of said piston member close to one of said pressure spaces, the wall of said one member between said recess and the distal end being substantially right circularly cylindrical; and passage means providing limited communication between said recess and said one pressure space for causing a controlled reduced pressure differential between said one space and the pressure of the fluid in said annular recess for effecting centering of said piston member in said bore to minimize frictional drag on the piston member.

12. In an apparatus having a cylindrical member movably received in an outer member bore having a first end opening to a high-pressure space and a second end opening to a low-pressure space, said cylindrical member having a transverse section smaller than that of said outer member bore to define a clearance space between said cylindrical and outer members, structure for effectively minimizing friction of the cylindrical member against the outer member bore wall as a result of fluid flow through said clearance space from said high-pressure space to said low-pressure space, said structure comprising: means on at least one of said members defining an annular recess in one of said members opening to said clearance space at a portion of said cylindrical member spaced adjacent a portion of said cylindrical member close to one of said pressure spaces; and grooves in one of said members opening radially to said clearance space and extending between said annular recess and the distal end of the cylindrical member defining means providing limited communication between said recess and said one pressure space for causing a controlled reduced pressure differential between said one space and the pressure of the fluid in said annular recess for effecting centering of said cylindrical member in said bore to minimize frictional drag on the cylindrical member.

13. The structure of claim 12 wherein said recess is in said cylindrical member.

* * * * *